Feb. 25, 1936.                E. L. BOWLES                 2,031,926
                              ELECTRIC METER
                        Original Filed Sept. 5, 1931
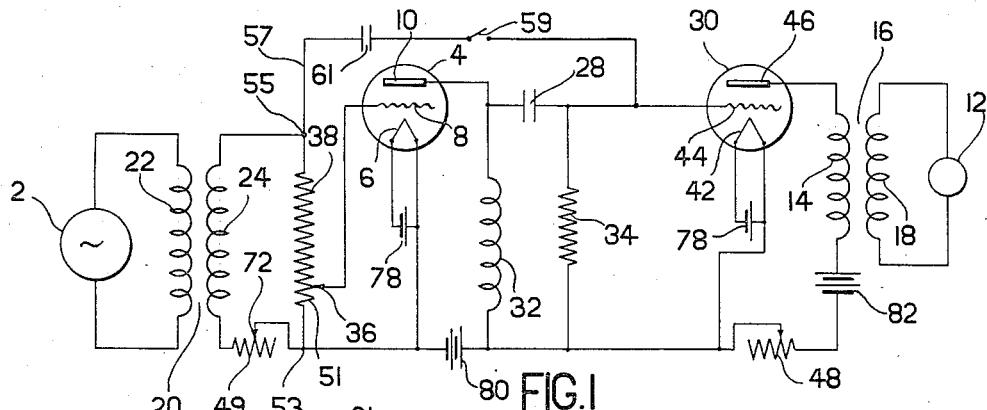
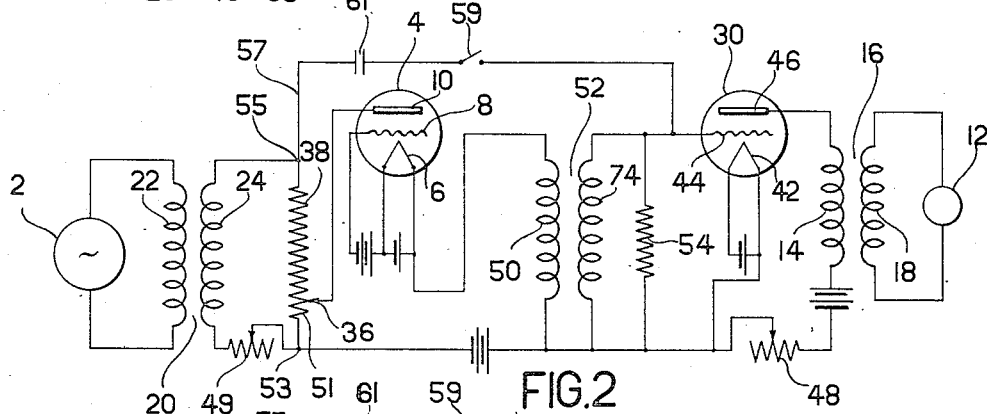
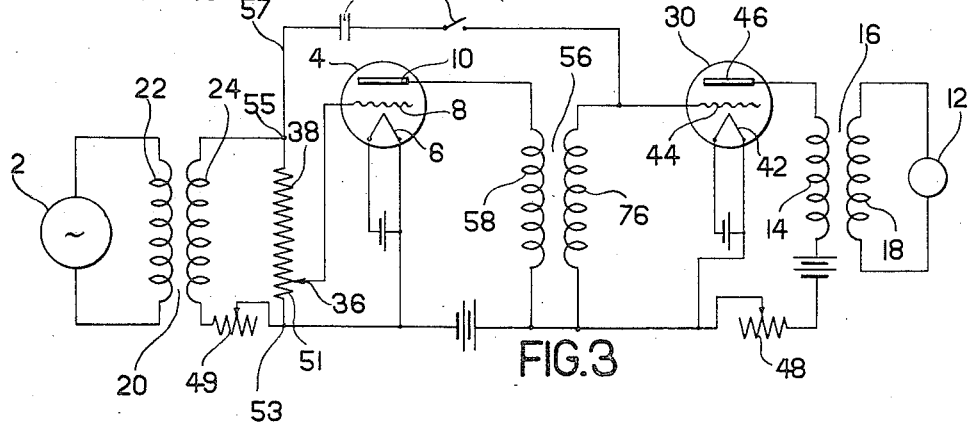
INVENTOR
*Edward L. Bowles*
BY
*David Reis*
ATTORNEY Patented Feb. 25, 1936

2,031,926

UNITED STATES PATENT OFFICE 2,031,926

ELECTRIC METER

Edward Lindley Bowles, Wellesley Farms, Mass.

Application September 5, 1931, Serial No. 561,405
Renewed May 21, 1935

22 Claims. (Cl. 250—27)

The present invention relates to electric meters. The invention is more particularly concerned with the measurement of the dynamic characteristics of space-current devices, like vacuum tubes, and other electric instruments.

Included within the term "dynamic characteristics" of a vacuum tube are the amplification coefficient, commonly denoted by $\mu$, the internal plate resistance, $r_p$, and the mutual conductance, $G_m$. In the case of a three-electrode vacuum tube, as is well known, these dynamic characteristics are differential functions of the plate and grid voltages and the plate current of the tube. They are obtainable from the static curves of the appropriate quantities, but very awkwardly and inaccurately, involving manual adjustment of direct-current resistances or other devices and interpretation of incremental variations of current. The amplification coefficient is given as the slope of the plate-voltage, grid-voltage characteristic of a vacuum tube; the dynamic, internal-plate resistance is given as the slope of the plate-voltage, plate-current characteristic (when plate volts are plotted as ordinates); and the mutual conductance is given as the slope of the grid-voltage, plate - current characteristic. These dynamic characteristics, therefore, apply to any region of the corresponding characteristic, no matter what the curvature, or the rate of change of the slope. The alternating measuring voltage must necessarily, therefore, be small enough so that the current response resulting from this voltage is proportional to the voltage. Should the voltage be too large, this relationship between cause and effect would not be linear and the response would, therefore, not be a true indication of the desired dynamic coefficient. It is a recognized fact, in other words, that, in measuring any dynamic-tube coefficient, the alternating, measuring voltage must be so small that no appreciable harmonics are produced (due to the curvature of the characteristic). These harmonics amount to by-products which vitiate the results sought.

According to the inventions disclosed in applications Serial Nos. 171,238, filed February 26, 1927, and 299,695 and 299,696, filed August 15, 1928, the said dynamic characteristics may be obtained by simple, direct-indicating schemes, and a chief object of the present invention is to improve upon the inventions disclosed in the said applications. Other objects will be explained hereinafter, and will be particularly pointed out in the appended claims, it being understood that it is intended to express in the claims all the novelty that the invention may possess.

The invention will be explained in connection with the accompanying drawing, in which Figs. 1, 2 and 3 are diagrammatic views of circuits and apparatus constructed and arranged, in accordance with a preferred embodiment of the present invention, to measure the amplification coefficient, the internal plate resistance and the mutual conductance, respectively.

To fix the ideas, let it be assumed that it is desired to measure the dynamic characteristics of a vacuum tube 4, having a filament 6, a grid 8 and a plate 10. Once the measurement of the characteristics of this tube is understood, the measurement of other electrical devices will be equally clear; and though the description will proceed upon the basis that a particular tube 4 is had in mind, it will also be apparent that any number of such tubes or other devices may be connected in and out of circuit, one after another, for the purposes of measurement.

Referring, first, to Fig. 1, the tube 4 is connected with a source of alternating voltage 2, either directly or, preferably, through a transformer 20. The primary winding 22 of the transformer 20 is connected in circuit with the source 2, and the secondary winding 24 is connected in the grid or input circuit of the tube 4. The secondary winding 24 is shown shunted by a resistor or voltage divider 38. By adjusting a slider 72 along a resistor 49, a definite, constant current may be caused to traverse the resistor 38, so that there may be applied to the grid 8 a definite voltage the magnitude of which is a function of the position of a slider 36. As is explained in the said applications, it is desirable to apply the same, constant voltage to the grids 8 of all tubes 4 under test, as this facilitates reading direct values of the dynamic characteristics upon an alternating-current, indicating instrument 12, such as a galvanometer. The use of a constant, impressed voltage is not, however, essential, for the readings of the meter 12 may be corrected by suitable calculations if known, variable voltages are applied to the grids 8 of the various tubes 4 under test. In fact, the use of known, variable, impressed voltages is sometimes desirable, as both low-amplification and high-amplification tubes 4 may then be measured with the same instrument 12. In such cases, furthermore, the instrument 12 may be provided with a plurality of differently graduated scales, each corresponding to a particular one of several impressed voltages.

The output circuit of the tube 4 is coupled to the input circuit of an amplifier 30 having a filament 42, a grid 44 and a plate 46. Several stages of amplification may be employed, if preferred. The coupling may be effected in any suitable manner, preferably, as shown, through a coupling impedance 32 of impedance so high that the internal plate resistance of the tube 4 is negligible by comparison. Under such conditions, an alternating voltage $V_g$, applied to the grid 8 of the tube 4 under test will produce a voltage $\mu V_g$ times as great across the impedance 32; and it is $\mu$ that it is desired to measure.

The increased voltage $\mu V_g$ may be impressed upon the input or grid circuit of the amplifier tube 30 through a by-pass condenser 28. A grid-leak resistor 34 enables any residual charge to leak off the grid 44. The alternating voltage thus produced in the plate circuit of the tube 30 will be transmitted through a transformer 16 to the meter 12. The primary winding 14 of the transformer 16 is connected in the output circuit of the amplifier 30 and the secondary winding 18 is connected with the meter 12. If the amplifier 30 be replaced by a detector tube, a direct-current instrument 12 may be inserted, instead, directly in the output circuit of the detector tube 30. In both cases, however, the dynamic characteristics will be read off directly from the instrument, as will be explained.

The resistance of the leak resistor 34 should be of such value that the internal impedance from the grid 44 to the filament 42 is large by comparison. The amplifier tube 30 may then be replaced by another amplifier without upsetting the characteristics of the same due to a change in the impedance in the circuits shown to the right of the impedance 32 and including the input impedance of the tube 30. Furthermore, since different tubes of the same type may have dynamic characteristics of different value, the use of different tubes 30 will introduce variations in the readings of the meter 12 for the same, constant voltage applied to the tube 4. As is also explained in the said applications, a variable resistor 48 may, therefore, be inserted in the output circuit of the amplifier 30 to compensate for such differences, and so as to give the same reading in the meter 12, notwithstanding different amplifiers 30 may be employed. The same result may, of course, be obtained by means of the variable resistor 49 in the input circuit of the tube 4, preferably in series with the secondary winding 24 and the resistor 38, as illustrated.

If the amplifier tube 30 should happen to be defective, without the defect becoming known, the reading of the meter 12 would be in error. It is, therefore, necessary to use a standard or calibrated tube 4, thereby to check the calibration of the meter 12.

In the operation of the system, as thus far explained, therefore, a calibrated tube 4, having a definite, known, amplification coefficient, is first inserted in the first stage of the device. As the dynamic characteristics of the amplifier tube 30 are not known, the resistor 48 or the resistor 49, or both, is adjusted until the indicating meter 12 reads the value of the amplification coefficient equal to that of the calibrated tube 4. The device is now ready for the measurement of the amplification coefficients of various tubes 4, and the meter 12 will indicate such amplification coefficients directly.

It is, however, disadvantageous to have to use a standard or calibrated tube 4. According to the present invention, therefore, it is possible to calibrate the device, and thus effect these amplification-coefficient measurements, even though the first tube 4 is not previously calibrated, so that its amplification coefficient is not previously known. The general principle will be understood from a consideration of the following, specific example.

Let it be assumed that the tubes 4 to be measured have an average amplification coefficient $\mu$ of about 10. The range may be, say, from 8 to 12. Then the resistor 38 is subdivided by the slider 36 so that the resistance of the portion 51, between one end 53 thereof and the point indicated by the slider 36, is one-tenth the resistance of the whole resistor 38. The voltage across the whole resistor 38 will, therefore, be ten times the voltage across the portion 51.

The other end 55 of the resistor is connected by a conductor 57 to the grid 44 of the amplifier tube 30. A key switch 59 and a by-pass condenser 61 are connected in series in the conductor 57. On closing the switch 59, with the tube 4 out of the socket (not shown), the resistor 48, or the resistor 49, or both, may be adjusted until the meter 12 gives an amplification-coefficient reading of 10. The device is now calibrated to correspond to the unknown amplification coefficient of the particular amplifier tube 30. If a different amplifier tube 30 is used, a different adjustment of the resistor 48 or the resistor 49, or both, will be made, so as always to have the meter 12 give an amplification-coefficient reading of 10,—or whatever other number may be adopted, corresponding to the division of the resistor 38 by the slider 36, and the average value of the amplification coefficients of the tubes 4. The adjustment of the slider 36 may, of course, be changed for different runs of tubes. Other variations, such as variations in line voltage may be compensated for in similar manner. An immediate and convenient check on accuracy is thus provided.

The tube 4 to be tested may now be connected into circuit by inserting it in the socket (not shown), and by opening the key 59. If it has an amplification coefficient of 10, the voltage across the portion 51 of the resistor 38 will impress upon the grid 44 of the amplifier tube 30 a voltage ten times as great, or equal to the voltage across the whole resistor 38. The meter 12 will, therefore, still read 10, indicating that this value is the amplification coefficient of the tube 4. The amplification coefficients of the tubes 4 under test will similarly be read directly on the meter 12.

As is also explained in the said applications, the dynamic internal plate resistance of the tube 4 may be measured by connecting the point indicated by the slider 36 in the output circuit of the tube 4, in series with the primary winding 59 of a transformer 52. Current from the output circuit of the tube 4 will be transmitted to the amplifier 30 by the transformer 52, and the amplified current will be measured by the meter 12.

The dynamic internal plate resistance may be measured, according to the present invention, in a number of ways. It will first be assumed, referring to Fig. 2, that a definite, constant voltage is impressed upon the output circuits of all tubes 4 under test. This may readily be brought about by adjusting the slider 36 along the voltage divider 38, which is traversed by a constant current. This can be conveniently accomplished, for example, by making the resistance of the resistor 38 small compared with the dynamic, internal plate resistance of the tube 4 under test. With the same, constant, impressed voltage for all tubes 4 under test, the current of the output circuit of the tube 4 will, of course, for practical purposes, be inversely proportional to the total impedance of the output circuit. As all other resistances of the output circuit are preferably exceedingly small compared to the internal plate resistance, the current in the output circuit of the tube 4, which is proportional to the voltage in the output circuit of the said tube 4, will, therefore, for practical purposes, be inversely proportional to the internal plate resistance. This facilitates reading direct values of the dynamic characteristics upon the alternating-current, indicating instrument 12; for, when different tubes 4, having different dynamic characteristics, such as internal plate resistances, are connected into circuit, the meter 12 will indicate the differences of internal plate resistance (or other dynamic characteristics, if the circuit is properly adjusted) by different deflections. As the deflection of the meter 12 will be proportional to the dynamic internal plate resistances of different tubes 4, the values of the dynamic, internal plate resistances of these different tubes may thus be read directly upon the meter 12.

It is not, however, essential that the other resistances associated with the internal plate resistance be negligible in comparison therewith. In fact, it may be desirable, under some conditions, so to arrange the circuits that the impedance, looking into winding 50 of the transformer 52, shall not be negligible compared with the internal plate resistance of the tube 4. Thus, if the impedance, looking into the transformer 52, were of the same order of magnitude as the internal plate resistance of the tube 4, the only effect would be to cause a different calibration of the scale of the instrument 12. In addition to the variable resistor 48, which is used as before described, a resistor 54 may be employed, connected between the grid 44 and the filament 42. The resistance of the resistor 54 should be of such value that the internal impedance from the grid 44 to the filament 42 is large by comparison. This decreases the effect of the internal input impedance of different amplifiers 30, with the result that the amplifier tube 30 may then be replaced by another amplifier without upsetting the characteristics of the same due to a change in the impedance in the circuits shown to the right of the transformer 52.

In this case too, and for like reasons, the test circuit including the meter 12 may have its calibration checked as follows: if it be supposed that the intercept portion 51 of the resistor 38 gives the necessary voltage to cause the meter 12 to indicate, let us say, 10,000 when a 10,000-ohm tube 4 is in the socket, then the voltage across the resistor 54 will be K times as large as the voltage across the intercept portion 51. If, now, the total resistance of the resistor 38 is K times the resistance of the intercept 51, the device can be checked from time to time simply by omitting the unknown tube 4, by closing the switch 59, and by adjusting the resister 49, or the resistor 48, or both, until the meter 12 reads 10,000 ohms.

It is understood that the impedance between grid and filament, composed of the self impedance of the secondary winding 74 and the resistor or impedance 54 in parallel, is so large, compared with the impedance measured between the points 55 and 53, when the tube 4 is out of the circuit, that, when the check calibrating switch 59 is closed, there is no appreciable effect on the voltage distribution in the input circuit to the tube 4.

The measurement of mutual conductance may be accomplished by means of the arrangement of Fig. 3. For illustration, it will first be assumed that a definite, constant voltage is impressed upon the input circuits of all tubes 4 under test, as in the arrangement of Fig. 1, but the output circuit is connected with the input circuit of the amplifier by a transformer 56. This may readily be brought about by adjusting the slider 36 along the voltage divider 38, which is traversed by a constant current. The input impedance of the primary winding 58 of the transformer 56 should be negligible when compared with the internal plate resistance of the tube 4, in order that, with a constant impressed voltage for all tubes 4 under test, the current of the output circuit shall be proportional to the amplification coefficient $\mu$ and inversely proportional to the impedance of the output circuit of the tube 4, which impedance is then substantially that of the internal impedance of the tube 4 under test, or $r_p$. The deflection of the meter will be proportional to the mutual conductance of the tube 4, and the value of the mutual conductance of different tubes 4 may, therefore, be read directly upon the meter 12.

Here, again, the calibration may be effected by means of the switch 59. For example, if, with a tube 4 of given mutual conductance, let us say, 1,000 micro-mhos a voltage appears on the grid of the tube 30 which is K times as large as the voltage across the intercept 51 of the resistor 38; and if the resistance of the resistor 38 is K times as large as that of the intercept portion 51; the check calibration may be accomplished by omitting the tube 4, by depressing key 59, and adjusting the resistor, 49, or the resistor 48, or both, until the instrument 12 reads 1,000 micro-ohms. It is understood that the self impedance of the secondary 76 of the transformer 56 is so large that, when the check-calibrating switch 29 is closed, the current thru it is negligible compared with the current thru the resistor 38. This depression of the switch 59 then in no way causes a reaction or change in the conditions in the input circuit of the tube 4.

The same apparatus, therefore, may, by different circuit connections, be employed to indicate, by direct deflection, the various dynamic characteristics of the vacuum tube 4. The connections may readily be changed by means of suitable switches (not shown). The tube 4 may be conveniently connected in and out of circuit by means of a suitable socket or other receptacle (not shown) that is permanently connected in circuit.

For definiteness, in the claims, the terms "alternating-current impulse" or its equivalent will be employed to denote either an alternating voltage or an alternating current.

The source of energy 2 may be a tuning-fork or a vacuum-tube oscillator or an oscillator of any other desired type, or even the ordinary, 60-cycle power mains. In place of the A batteries 78, and the B batteries 80, alternating-current power supplies may be used, with suitable rectifying and smoothing means. Other modifications will, also, readily occur to persons skilled in the art, and all such are intended to be embraced within the appended claims.

What is claimed is:

1. A method of calibrating an instrument for measuring a dynamic characteristic of a space-current device externally connected so as to have an input circuit and an output circuit, the said instrument having means for impressing a voltage upon the device, a second space-current device having an input circuit connected with the output circuit of the first-named device, and a meter for measuring the voltage of the output circuit of the second device, the said method comprising, with the first-named device out of the circuit, inserting into circuit a voltage approximately equal to the impressed voltage multiplied by the value of the said dynamic characteristic, and adjusting the circuits to give a reading on the meter approximately equal to the said value.

2. A method of calibrating an instrument for measuring a dynamic characteristic of a space-current device externally connected so as to have an input circuit and an output circuit, a predetermined portion of a resistor, across which a voltage is impressed, being connected with the device, the said instrument having a second space-current device having an input circuit connected with the output circuit of the first-named device and a meter for measuring the voltage of the output circuit of the second device, the said method comprising, with the first-named device removed, inserting the whole resistor into circuit, and adjusting the circuits to give a predetermined reading on the meter.

3. A method of calibrating an instrument for measuring a dynamic characteristic of a space-current device externally connected so as to have an input circuit and an output circuit, a predetermined portion of a resistor, across which a voltage is impressed, being connected with the device, the said predetermined portion being approximately equal to the reciprocal of the value of the said dynamic characteristic, the said instrument having a second space-current device having an input circuit connected with the output circuit of the first-named device, and a meter for measuring the voltage of the output circuit of the second device, the said method comprising, with the first-named device out of circuit, inserting the whole resistor into circuit, and adjusting the circuits to give a reading on the meter approximately equal to the said value.

4. A method of calibrating an instrument for measuring the amplification coefficient of a space-current device externally connected so as to have an input circuit and an output circuit, the output circuit having an impedance of value so high that the internal plate resistance of the device is negligible by comparison, and the said instrument having means for impressing a voltage upon the input circuit, a second space-current device having an input circuit connected with the output circuit of the first-named device, and a meter for measuring the voltage of the output circuit of the second device, the said method comprising, with the first-named device out of circuit, inserting into circuit a voltage approximately equal to the impressed voltage multiplied by the value of the said amplification coefficient, and adjusting the circuits to give a reading on the meter approximately equal to the said value.

5. A method of calibrating an instrument for measuring a dynamic characteristic of a space-current device externally connected so as to have an input circuit and an output circuit, a predetermined portion of a resistor, across which a voltage is impressed, being connected in the input circuit, the said instrument having a second space-current device having an input circuit connected with the output circuit of the first-named device, and a meter for measuring the voltage of the output circuit of the second device, the said method comprising, with the first-named device out of circuit, inserting the whole resistor into circuit, and adjusting the circuits to give a predetermined reading on the meter.

6. A method of calibrating an instrument for measuring the amplification coefficient of a space-current device externally connected so as to have an input circuit and an output circuit, a predetermined portion of a resistor, across which a voltage is impressed, being connected in the input circuit, the said predetermined portion being approximately equal to the reciprocal of the value of the said amplification coefficient, the said instrument having a second space-current device having an input circuit connected with the output circuit of the first-named device, and a meter for measuring the voltage of the output circuit of the second device, the said method comprising, with the first-named device out of circuit, inserting the whole resistor into circuit, and adjusting the circuits to give a reading on the meter approximately equal to the said value.

7. A method of calibrating an instrument for measuring the mutual conductance of a space-current device externally connected so as to have an input circuit and an output circuit, the output circuit having an impedance of value so high that the internal plate resistance of the device is negligible by comparison, and the said instrument having means for impressing a voltage upon the input circuit, a second space-current device having an input circuit connected with the output circuit of the first-named device, and a meter for measuring the voltage of the output circuit of the second device, the said method comprising, with the first-named device out of circuit, inserting into circuit a voltage approximately equal to the impressed voltage multiplied by a constant factor, and adjusting the circuits to give a reading on the meter approximately equal to the proper calibrated value.

8. A method of calibrating an instrument for measuring the mutual conductance of a space-current device externally connected so as to have an input circuit and an output circuit, a predetermined portion of a resistor, across which a voltage is impressed, being connected in the input circuit, the said predetermined portion being approximately equal to the reciprocal of the value of the said mutual conductance, the said instrument having a second space-current device having an input circuit connected with the output circuit of the first-named device, and a meter for measuring the voltage of the output circuit of the second device, the said method comprising, with the first-named device out of circuit, inserting the whole resistor into circuit, and adjusting the circuit to give a reading on the meter approximately equal to the said value.

9. Apparatus for measuring a dynamic characteristic of an electric device having, in combination, a circuit in which the device is connected, means for impressing an alternating voltage upon the circuit, means for adjusting the voltage, an amplifier, means for removing the device from the circuit and for inserting into circuit a voltage approximately equal to the impressed voltage multiplied by the value of the dynamic characteristic, and means for measuring an alternating-current impulse of the amplifier.

10. Apparatus for measuring a dynamic characteristic of a space-current device having, in combination, a source of alternating current, an adjustable resistor connected with the source and to which the device is connected, an amplifier for amplifying the current or voltage of the device, means, with the device out of circut for inserting the whole resistor into circuit, and an alternating-current meter for measuring the amplified current or voltage.

11. Apparatus for measuring the amplification coefficient of a space current device having an input circuit and an output circuit having, in combination, means for impressing a voltage upon the input circuit, an impedance in the output circuit of value so high that the internal plate resistance of the device is negligible by comparison, an amplifier for amplifying the voltage of the output circuit, and means, with the device removed, for measuring the amplified voltage.

12. Apparatus for measuring the amplification coefficient of a space-current device having an input circuit and an output circuit having, in combination, means for impressing a voltage upon the input circuit, an impedance in the output circuit of value so high that the internal plate resistance of the device is negligible by comparison, a second space-current device having an input circuit in which the impedance is connected and an output circuit containing a variable impedance, means, with the first-named device removed, for inserting into circuit a voltage approximately equal to the impressed voltage multiplied by the value of the said amplification coefficient, and means for measuring the voltage of the amplifier output circuit.

13. Apparatus for measuring the amplification coefficient of a space-current device having an input circuit and an output circuit having, in combination, means for impressing a voltage upon the input circuit, means for adjusting the voltage, an impedance in the output circuit of value so high that the internal plate resistance of the device is negligible by comparison, an amplifier having an input circuit connected across the impedance and an output circuit, means for compensating for the amplification of the amplifier, means, with the device removed, for inserting into circuit a voltage approximately equal to the impressed voltage multiplied by the value of the said amplification coefficient, and means for measuring the voltage of the amplifier output circuit.

14. Apparatus for measuring the amplification coefficient of a space-current device having an input circuit and an output circuit having, in combination, a resistor, means for connecting a predetermined portion of the resistor in the input circuit, means for impressing a voltage across the resistor, a second space-current device having an input circuit connected with the output circuit of the first-named device, means for removing the first-named device out of circuit and for inserting the whole resistor into circuit, and means for measuring the voltage of the output circuit of the second device.

15. Apparatus for measuring the dynamic internal plate resistance of a space-current device having an input circuit and an output circuit having, in combination, means for connecting a source of voltage with the output circuit, an amplifier for amplifying the current of the output circuit, and means, with the device out of circuit, for measuring the amplified current.

16. Apparatus for measuring the dynamic internal plate resistance of a space-current device having an input circuit and an output circuit having, in combination, means for impressing a voltage upon the output circuit, means for adjusting the voltage, an amplifier having an input circuit coupled to the output circuit of the device and an output circuit, means for compensating for the amplification of the amplifier, means, with the device out of circuit, for inserting into circuit a voltage approximately equal to the impressed voltage multiplied by a constant factor involving the said dynamic internal plate resistance, and means for measuring the current of the amplifier output circuit.

17. Apparatus for measuring the mutual conductance of a space-current device having, in combination, an input circuit, an output circuit, the impedance in the output circuit having a value so low that it is negligible compared with the internal plate resistance of the tube, means for connecting the space-current device in the input circuit and the output circuit, means for impressing a voltage upon the input circuit, an amplifier for amplifying the current of the output circuit, and means with the device out of circuit for calibration, for measuring the amplified current.

18. Apparatus for measuring the mutual conductance of a space-current device having an input circuit and an output circuit having, in combination, means for impressing a voltage upon the input circuit, means for adjusting the voltage, an amplifier having an input circuit coupled to the output circuit of the space-current device and an output circuit, means, with the device out of circuit, for inserting into circuit, in substitution for the device, a voltage approximately equal to the impressed voltage multiplied by a constant factor involving the said mutual conductance, and means for measuring the current of the amplifier output circuit.

19. A method of calibrating an instrument for measuring a dynamic characteristic of a space-current device externally connected so as to have an input circuit and an output circuit, the said instrument having means for impressing a voltage upon the device, and a meter for measuring the voltage of the output circuit, the said method comprising, with the device out of circuit, inserting into circuit a voltage approximately equal to the impressed voltage multiplied by a constant factor involving the said dynamic characteristic, and adjusting the circuits to give a predetermined reading on the meter.

20. A method of calibrating an instrument for measuring a dynamic characteristic of a space-current device externally connected so as to have an input circuit and an output circuit, and a resistor connected with the device, and a meter for measuring the voltage of the output circuit of the device, the said method comprising impressing a voltage across a predetermined portion of the resistor approximately equal to the value of the said dynamic characteristic multiplied by a constant factor and, with the device out of circuit, inserting the whole resistor into circuit, and adjusting the circuits to give a predetermined reading on the meter.

21. Apparatus for measuring a dynamic characteristic of an electric device having, in combination, a circuit in which the device is connected, means for impressing a voltage upon the circuit, means for adjusting the voltage, means, with the device out of circuit, for inserting into circuit, in substitution for the device, a voltage approximately equal to the impressed voltage multiplied by a constant factor involving the said dynamic characteristic, and means for measuring an alternating-current impulse of the circuit.

22. Apparatus for measuring a dynamic characteristic of a space-current device having, in combination, a source of alternating current, an adjustable resistor connected with the source and to which the device is connected, means, with the device out of circuit, for inserting the whole resistor into circuit, and an alternating-current meter for measuring an alternating-current impulse of the device.

EDWARD LINDLEY BOWLES.